United States Patent [19]

Michiguchi et al.

[11] Patent Number: 5,081,456
[45] Date of Patent: Jan. 14, 1992

[54] METHOD OF DETECTING UNKNOWN OBJECT AND APPARATUS THEREFOR

[75] Inventors: Yoshihiro Michiguchi, Ibaraki; Masatsugu Nishi, Katsuta; Kazuo Hiramoto, Hitachi, all of Japan

[73] Assignee: Hitachi, Ltd., Tokyo, Japan

[21] Appl. No.: 180,964

[22] Filed: Apr. 13, 1988

[30] Foreign Application Priority Data

Apr. 13, 1987 [JP] Japan ................... 62-90367

[51] Int. Cl.⁵ .................. G01S 13/89; G01S 13/86; G01S 7/06
[52] U.S. Cl. .................... 342/22; 342/181; 342/351; 342/55
[58] Field of Search .................. 342/21, 22, 27, 55, 342/181, 351

[56] References Cited

U.S. PATENT DOCUMENTS

| | | | |
|---|---|---|---|
| 3,500,395 | 3/1970 | Foster et al. | 342/27 X |
| 3,599,211 | 8/1971 | Mardon | 342/351 |
| 3,713,156 | 1/1973 | Pothier | 342/27 |
| 3,911,435 | 10/1975 | Mardon et al. | 342/351 |
| 4,064,458 | 12/1977 | De Loach, Jr. | 342/70 X |

OTHER PUBLICATIONS

Reber et al., "Evaluation of Active and Passive Near--Millimeter-Wave Radiometric Imaging Techniques for Detection of Concealed Objects", Mar. '81, The Aerospace Report No. ATR-80(7843)-2, prepared for Sandia Laboratories, Alburquerque, N. Mex.

G. F. Abbott, "Personal Surviellance System", IBM Tech. Disclosure Bulletin, vol. 12, #7, Dec. 1969, pp. 1119-1120.

Primary Examiner—Gilberto Barrén, Jr.
Attorney, Agent, or Firm—Antonelli, Terry, Stout & Kraus

[57] ABSTRACT

In visualizing an unknown object possessed by a person to be checked, a narrow pulsating radio wave beam is scanned over the whole surface of the person to observe the intensity of a reflected radio wave at each scan point. The frequency of the radio wave beam is set at a frequency easy to be transmitted by the human body to suppress the reflection from the human body and emphasize the unknown object to thereby discriminate between them. An image of the person to be checked is displayed and the portion having a strong reflection is color-displayed on the image to allow the check of the unknown object possessed by the person without contacting the person.

42 Claims, 6 Drawing Sheets

TRANSMITTED ELECTRIC SIGNAL WAVEFORM

→ TIME

REFLECTION WAVEFORM

DETECTION WAVEFORM

PEAK

METHOD OF DETECTING UNKNOWN OBJECT AND APPARATUS THEREFOR

BACKGROUND OF THE INVENTION

The present invention relates to a method and apparatus for detecting unknown objects such as dangerous weapons kept secret by persons, animals and the like. More specifically, this invention concerns a method and apparatus for visualizing unknown objects suitable for use in checking one's belongings at airports or the like.

As well known in the art of checking one's belongings at airports or the like, x-ray seeing-through check for one's baggages, and magnetic check and body check for human body are widely adopted.

Of the above prior art techniques, the magnetic check for a person has a fear of failing to find dangerous weapons or the like, depending on the locations where the person hides the weapons and on other conditions. The body check for finding dangerous weapons takes long time, and in addition it requires thoughtful care of personal rights.

According to the present invention, unknown weapons such as dangerous objects hidden by persons or animals are visualized using pulsating radio waves. A prior art relevant to this invention in this sense is a radar which transmits a pulsating radio wave to the broad area in the air and receives a reflected radio wave to detect a presence of a target substance. However, a conventional radar uses a broad radio wave beam so that it is impossible to visualize a target substance minutely. Also as seen from an airplane radar, it is not necessary to discriminate the target from other targets (e.g., ground or the like) so that conventional radar technique cannot be adopted for checking one's belongings.

SUMMARY OF THE INVENTION

It is an object of the present invention to solve the above problems and to provide a method and apparatus for precisely visualizing unknown objects such as dangerous weapons or the like without touching a person to be checked.

According to one aspect of the present invention, in checking an unknown object kept by a living body by radiating a radio wave, the body to be checked is scanned by a focussed radio wave with its frequency regulated so as to make the strength of a radio wave reflected from the living body have a lower value than a preset value, and the strength of reflected radio wave at each scan position is obtained to visually display the distribution of reflected radio waves at scan positions.

Specifically, according to the present invention, in order to visualize a dangerous weapon kept by a person to be checked, the entire surface of the person is scanned by a narrow pulsating radio wave to observe the strength of reflected radio wave at each scan position. The frequency of a pulsating radio wave is controlled in this case, since it is necessary to discriminate a human body from an unknown object such as a weapon. A radio wave whose frequency band is more transmissive to the human body and accordingly less reflective therefrom is used to reduce the reflection from the human body and emphasize the unknown object such as a weapon. The person to be checked is visually displayed while the portion of strongly reflected radio waves is superimposed on the displayed image, e.g., in color representation. In addition, the strongly reflected portion is further observed in detail by using a higher frequency. By the above operations, it becomes possible to visually display and check unknown objects such as dangerous weapons kept by a person to be checked, without touching the person.

DESCRIPTION OF THE PREFERRED EMBODIMENTS

Figure 1:
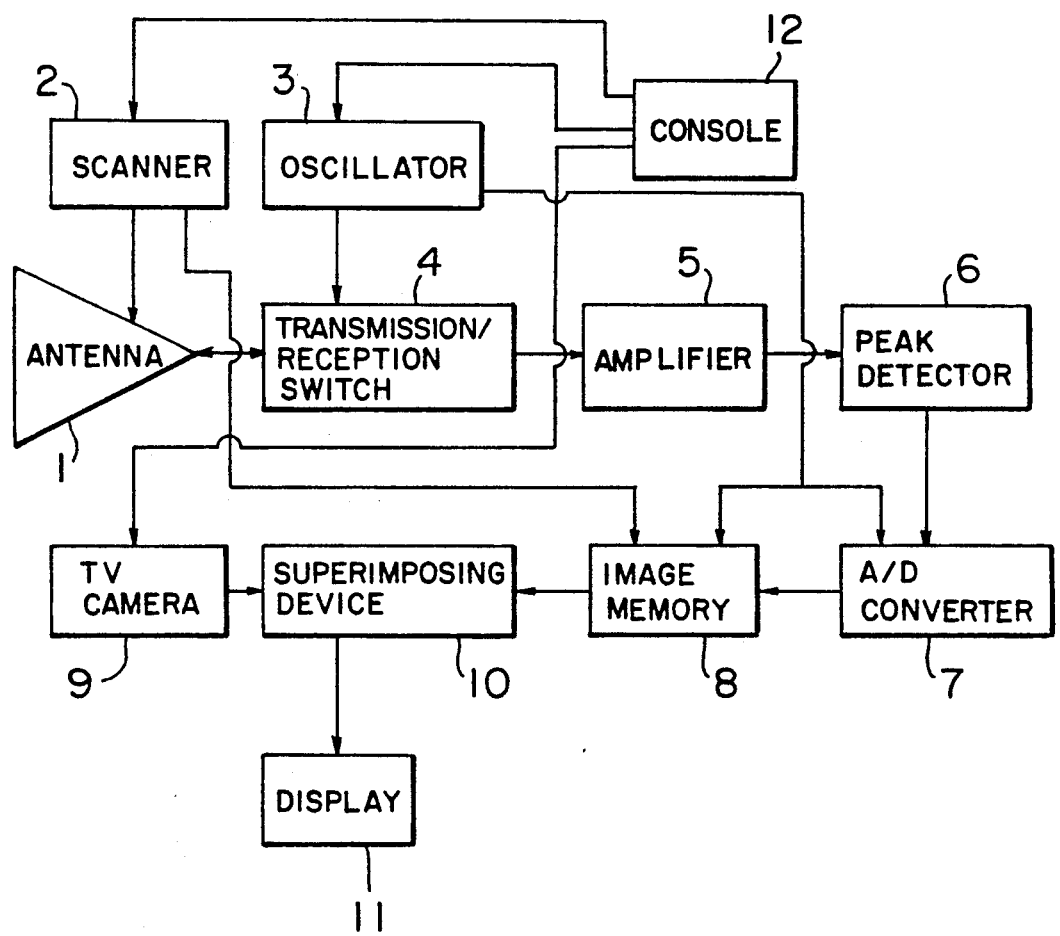
FIG. 1 is a block diagram showing a first embodiment of this invention.

An embodiment of the present invention will now be described with reference to FIG. 1. In the figure, an antenna 1 of a wide frequency band, which may be a parabolic antenna or the like, has a function of focussing a radio wave beam. The radio wave beam herein used is focussed narrow enough to obtain a resolution necessary for visualizing a person to be checked and a dangerous object. The antenna 1 is driven by a scanner 2 to change the radiation direction of a radio wave beam. The frequency of an oscillator 3 is adapted to be changed. An electric signal intermittently generated by the oscillator 3 is fed via a transmission/reception switch or duplexer 4 to the antenna 1 to be radiated to the person to be checked in the form of radio wave beam. A reflected radio wave from the person and the dangerous weapon or the like is detected by the same antenna 1 to be amplified via the duplexer 4 at an amplifier 5. Thereafter, a peak value of the reflected radio wave is detected by a peak detector 6 and outputted therefrom. The peak value of the reflected radio wave is converted into a digital value by an analog/digital converter 7 and stored in an image memory 8. The position of a stored value in the image memory 8 corresponds to the area of the person to which the radio wave was radiated. The radiation position information is obtained from the antenna scanner 2.

A television camera 9 having a zoom function can obtain an image of the person to be checked. A known superimposing device 10 superimposes an image of the person obtained by the television camera 9 upon the contents of the memory 8 storing the reflected radio wave intensity distribution. The image obtained by the superimposing device 10 is displayed on a display 11. A console 12 is used for the control of a radio wave beam radiation direction, an oscillation frequency, and a monitor area of the television camera.

Figure 2:
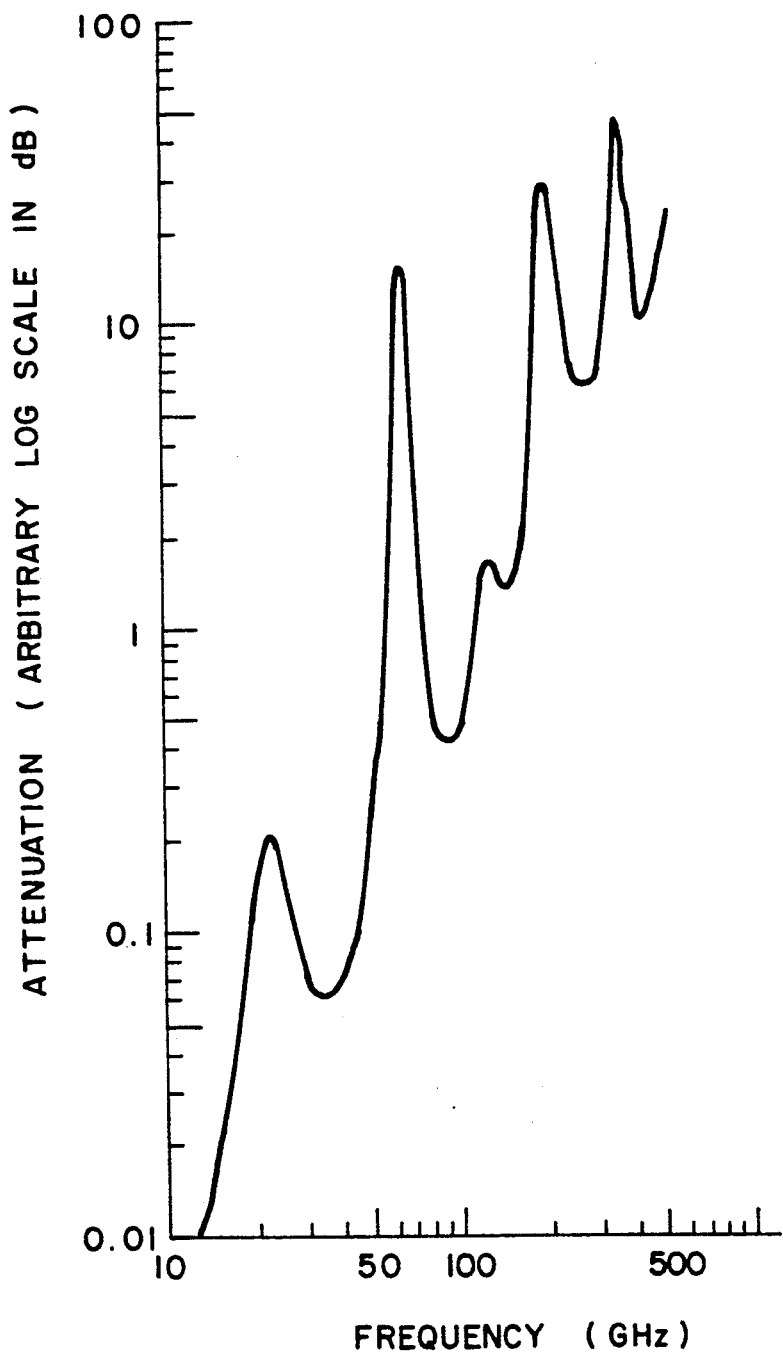
FIG. 2 is a graph showing the absorption characteristic of radio waves in water which is the main components of a subject to be checked.

A selection of a frequency to be used will be described next. FIG. 2 shows the measurement result of radio wave attenuation during propagation in the air. Several high attenuation peaks are seen in the graph which are known as resulted from molecular absorption as shown in the following:

Absorption by water: about 22 GHz, 180 GHz and 310 GHz.

Absorption by oxygen molecular: about 60 GHz

According to the present invention, absorption peaks by water in particular are taken into consideration in selecting a frequency in use which is easy to be absorbed by a human body. Namely, in the graph of FIG. 2 showing attenuation data in the air, a frequency easy to be absorbed by a human body can be selected from those water absorption data.

Figure 3:
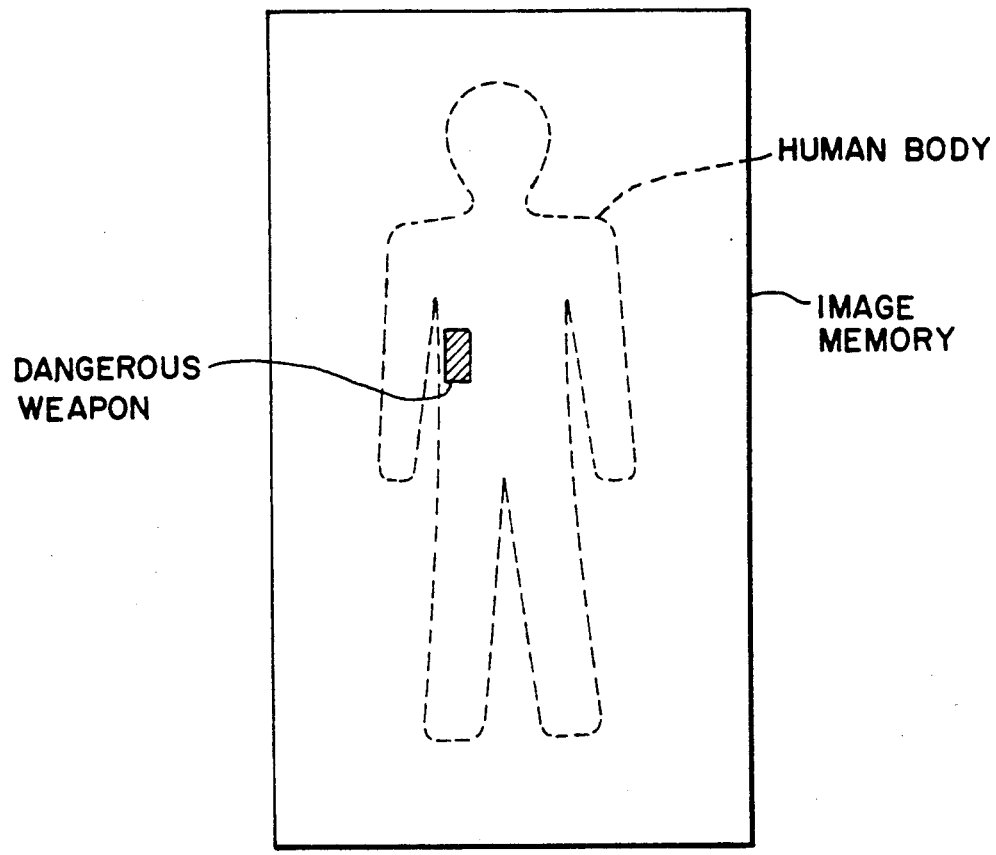
FIG. 3 illustrates a correspondence of an image obtained in the first embodiment with the memory contents.

An image of a person to be checked will be given which image was obtained by the apparatus shown in FIG. 1 using a radio wave at a frequency easy to be absorbed by a human body. FIG. 3 shows an example of a reflected radio wave intensity distribution obtained by checking a person with a radio wave at a frequency having a small reflection from and a large absorption to the person. The intensity distribution corresponds in position to the contents of the image memory 8 and is displayed by superposing it upon the television camera image of the person. In FIG. 3, a broken line represents the body of the person. If the frequency of a radio wave is selected such that the radio wave cannot be absorbed by a human body, a radio wave reflected by the human body is considerably strong so that it is difficult to discriminate a dangerous weapon from the human body, thus observing only the reflected radio wave intensity. According to the present invention, the variable frequency oscillator is used so that it is possible to select a radio wave at a frequency having a large absorption and hence a small reflection relative to the human body. In this case, although most of the radio wave beam incident to the surface of a human body is absorbed by the human body, there is no harmful effect upon the human body because of a low radio wave output. If a person to be checked has an unknown object such as a dangerous weapon, a large reflected radio wave intensity therefrom can be obtained. Therefore, as shown in FIG. 3, an intensity distribution can be obtained with a small intensity at the human body portion and a large reflection intensity at the unknown object portion. As described before, this intensity distribution is displayed by superimposing it on an image of the person to be checked from the television camera, thus enabling to detect on the displayed screen where the person hides the unknown object such as a dangerous weapon.

Figure 4A:
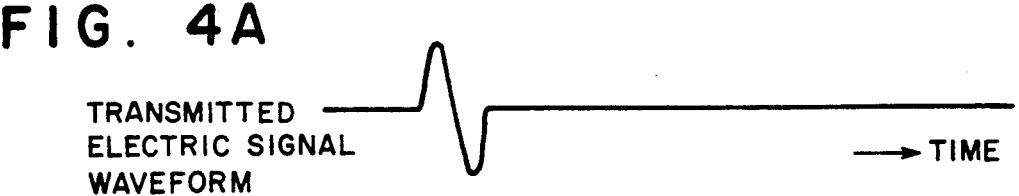
FIGS. 4A to 4C show examples of waveforms obtained in the circuit of the first embodiment.
Figure 4B:
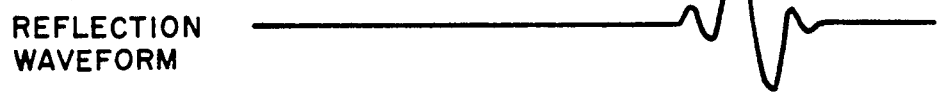
Figure 4C:

FIGS. 4A to 4C show waveforms obtained by the apparatus. In this example, a transmitted radio wave is shown as having one wavelength of a sine wave. However, the number of wavelengths may be plural. A radio wave reflected from the person to be checked is detected after a time delay from radio wave transmission. The reflected radio waves includes those from the clothes, weapon and body surface of the person. Since the frequency of a transmitted radio wave is selected at a frequency having a low reflection from water contents of the person to be checked, radio waves are reflected from both the clothes and the weapon. However, the reflection level is higher at the weapon than at the clothes so that they can be discriminated from each other to confirm the presence of the weapon.

It is also possible to enlarge and check the high intensity portion of the confirmed unknown object. To this end, upon reception of a control signal from the console 12, the following operations are performed:

(1) Zooming up the television camera 9,
(2) Scanning radio waves within the image area of the television camera 9, and
(3) Setting the oscillator 3 at a higher frequency. The image area of the television camera 9 and the scan area of a radio wave is so arranged to become in correspondence with each other by means of the scanner. Therefore, the specific portion now in concern shown in FIG. 3 can be enlarged while maintaining the correspondence between the images by the television camera and the image memory. In addition, the frequency of the oscillator is raised to a higher frequency having a lower reflection from the person to be checked. This further contributes to reduction of the effective diameter of a radio wave beam to be small to thereby enable to obtain a more detailed unknown object image.

The above detailed description has been directed to a single imaging system. With this system, it is possible to check an unknown object as viewed, e.g., from the front of a human body. In checking an unknown object as viewed from the back of a human body, the person is made turned back. Alternatively, two imaging systems may be adopted to check an unknown object as viewed at the same time both from the front and the back. Multi imaging systems are similar in operation and construction to those of a single imaging system so that the detailed description therefor is omitted. Another modified system may be adopted wherein a plurality of antennas each scanning only in the horizontal direction at a different height of a human body, are switched sequentially for transmission/reception of a radio wave.

As seen from the detailed description of the first embodiment, an unknown object such as a dangerous weapon can be visualized clearly by suppressing a reflection from a human body which reflection has been an obstacle in visualization of an unknown object.

Figure 5:
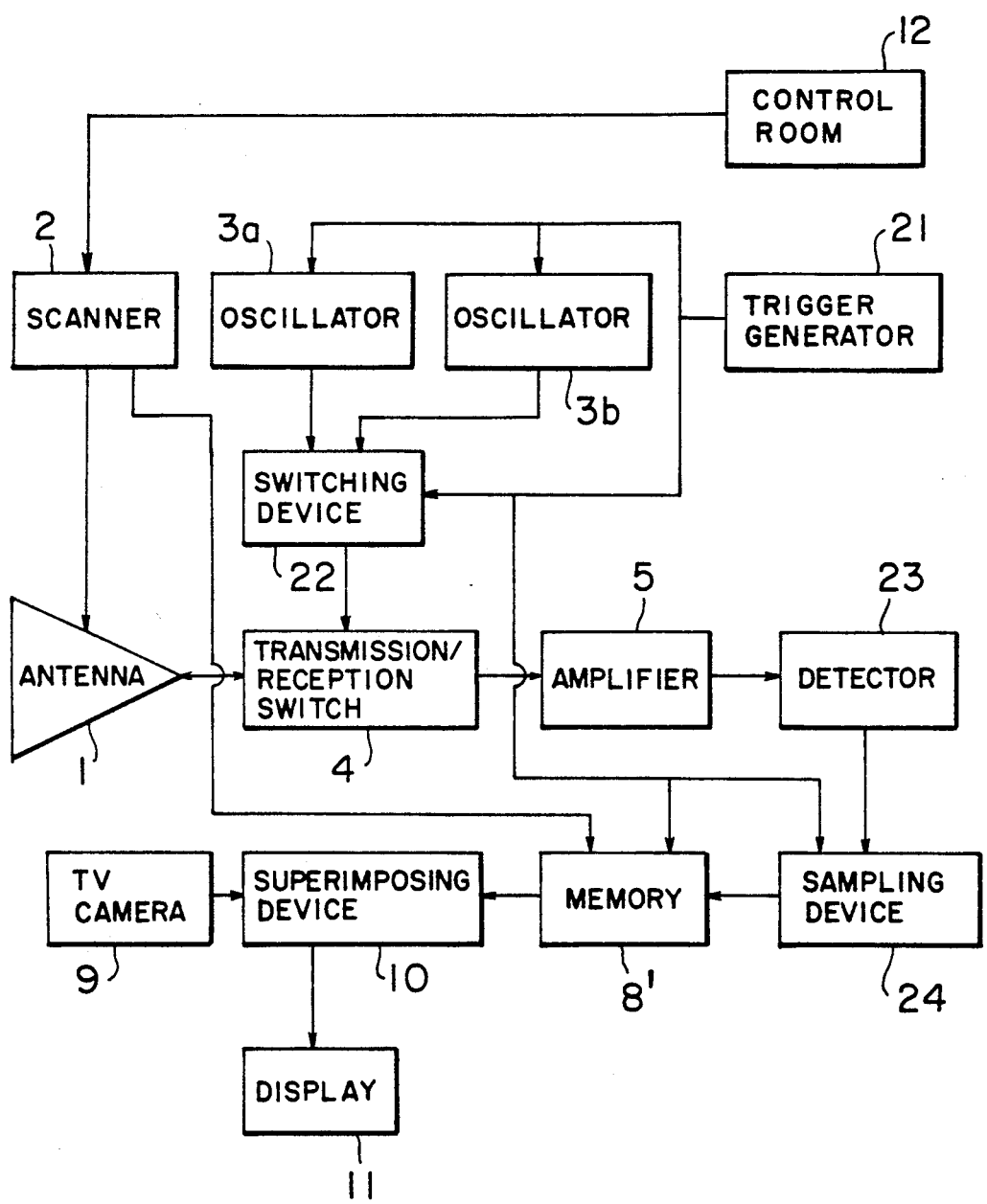
FIG. 5 is a block diagram showing a second embodiment of this invention.

FIG. 5 is a block diagram showing another embodiment of this invention. This embodiment features in that two radio waves are used, one with a frequency easy to be reflected by the body surface of a person to be checked, and the other with a frequency easy to be transmitted and absorbed by the human body. Thus, two oscillators 3a and 3b are provided which generate pulsating signals in response to a signal from a trigger generator 21. A switching device 22 selects the oscillators 3a and 3b alternately so that a pulsating signal having a different frequency is alternately outputted from the switching device 22. This pulsating signal is sent to the duplexer 4 and transmitted in the form of radio wave from the antenna 1. A reflected radio wave is received by the same antenna 1, amplified by the amplifier 5, detected by a detector 23 and thereafter sampled by a sampling device 24 which uses the same technique as in a known sampling oscilloscope. The contents of a memory 8' are different from those of the memory 8 shown in the first embodiment.

Figure 6:
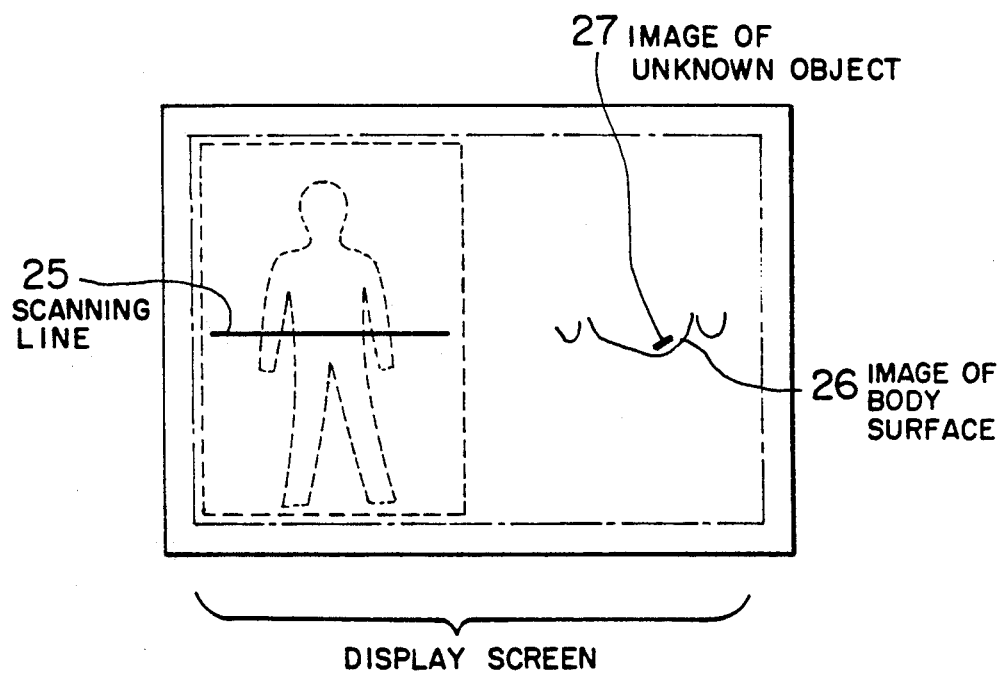
FIG. 6 illustrates a correspondence of an image obtained in the second embodiment with the memory contents.

The correspondence between the contents of the memory 8' and an image will be detailed hereinafter. FIG. 6 illustrates an image displayed on the display 11 and the contents of the memory 8'. Within a broken line of FIG. 6, there is displayed an image of a person to be checked obtained by the television camera 9. An image inside a one-dot-chain line corresponds to the contents of the memory 8'. The contents of the memory 8' displayed within the one-dot-chain line are divided into the right and left areas. The memory corresponding to the left area and superposed upon the television camera image stores scan position signals from the scanner 2. In this embodiment, a radio wave beam is scanned once in a desired direction along the person to be checked. In the example shown in FIG. 6, a radio wave beam is shown scanned along a scan line 25. This scan line is stored in the - 25 memory 8' and displayed by superposing it upon the image of the person by means of the superimposing device 10. Thus, the inspector can recognize which area of the person was scanned and monitored by the apparatus. In the right area of the memory 8' not superposed on the television camera image, two types of information on the scan line are stored. The information of one type is a time from radio wave transmission to reflected radio wave detection, and the information of the other type is a reflected radio wave intensity. The time of radio wave detection stored in the memory 8' corresponds to the vertical direction in FIG. 6 wherein time is represented as advancing from down to up in the figure. The horizontal direction in the display screen relative to the contents of the memory 8' corresponds to the scan direction of a radio wave beam. With the above correspondence between the memory contents and the displayed image on the screen, an image 26 stored in the memory 8' and displayed by the superimposing device 10 corresponds to an image of a reflected radio wave on the scan line 25, with the ordinate of the screen being used as a time from radio wave transmission to reflected radio wave detection. The image accordingly represents the body surface cross section of the person along the scan line 25.

In the above embodiment, two radio beams having a different frequency are used and scanned on the same scan line 25 to observe the person to be checked. Therefore, at the frequency easy to be reflected by the body surface of the person, the body surface cross section of the person can be obtained as shown at 26 in FIG. 6. On the other hand, at the frequency easy to be transmitted into the human body, an unknown object in the body can be observed as shown at 27 in FIG. 6. Both the images are displayed in different color on the display 11 to clearly discriminate and visualize them.

In the above embodiment, the console 12 is used for changing the position of a scan line along which the person is scanned. That is, a scan line is designated by which a desired check area can be observed on the display 11. Thus, the check on the television camera image can be concentrated on the unnatural body surface portion of the person to be checked.

As seen from the detailed description of the second embodiment, two different frequency radio waves one having a frequency easy to be reflected from the body surface and the other having a frequency easy to be transmitted and absorbed in the body, are scanned on the same scan line to visualize the reflected radio wave detection time and the reflected radio wave intensity, and hence visualize an unknown object possessed by the person near at the body surface. According to this embodiment, even if the person to be checked intentionally hides a dangerous object within a substance having large water contents, the object can be effectively visualized. Further, even when an unknown object which is so small as to prevent sufficient reflection intensity, is scanned the inspector can recognize the abnormal state of the person to be checked, based on the unnatural body surface image thereof.

Figure 7:
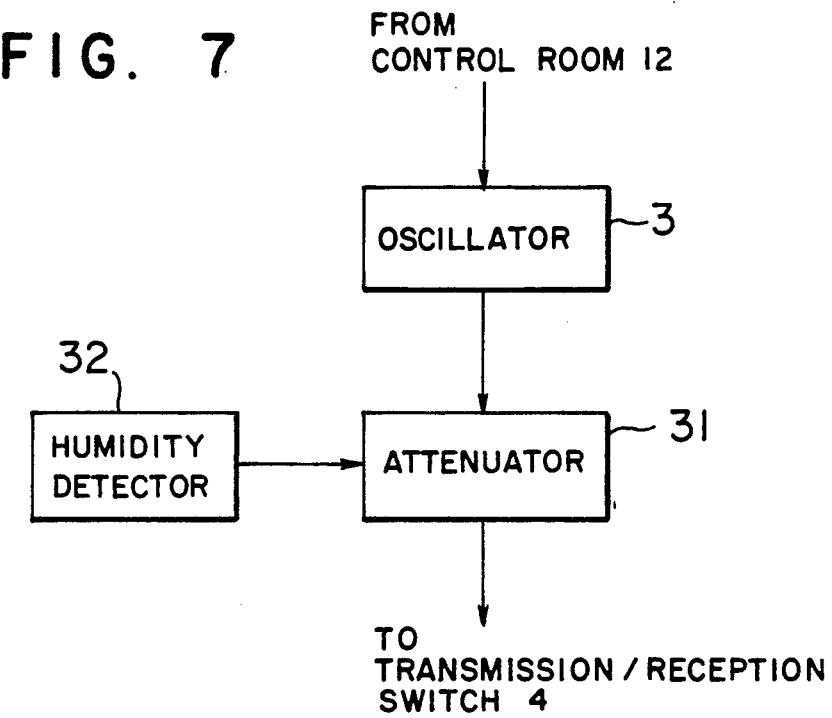
FIGS. 7 and 8 are block diagrams showing the circuit portions of third and fourth embodiments, the circuit portions each being added to the circuit of the first embodiment.

FIG. 7 is a block diagram showing a third embodiment of the present invention, the remaining portions of the apparatus being the same as those of FIG. 1. This embodiment features in the compensation for the effect of absorption of a radio wave into vapor contained in the air and attenuation of the reflected radio wave, by controlling the output level of the oscillator in accordance with the water contents in the air. In particular, as shown in FIG. 7, an attenuator 31 is coupled at the output of the oscillator 3 to control the attenuation quantity in accordance with an output from a humidity detector 32. The attenuation quantity of the attenuator 31 is previously set in accordance with a signal level of the humidity detector 32, the attenuation quantity being set smaller as the humidity becomes larger. Therefore, as the humidity in the air becomes large, the output of the oscillator 3 becomes large to thus compensate for the radio wave absorption by vapor in the air.

Figure 8:
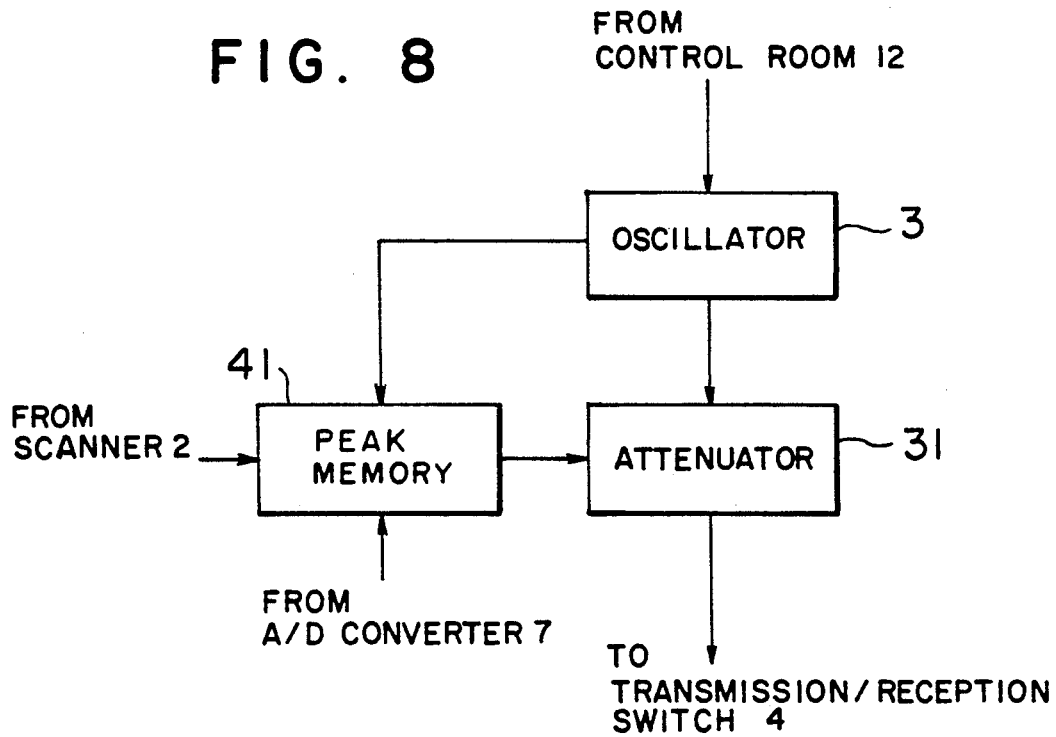

A fourth embodiment shown in FIG. 8 aims at compensating for radio wave attenuation by vapor in the air, similar to the third embodiment. The remaining portions of the apparatus are the same as those shown in FIG. 1. In this embodiment, there is provided a standard reflector near the person to be checked to control the attenuation quantity of the attenuator 31 while maintaining the reflection intensity of the reflector constant. Control information for the attenuator 31 is obtained from a peak value memory 41 to which a reflected signal value of the A/D converter 7 detected by the peak detector 6 is inputted. Also inputted to the peak value memory 41 is a position signal from the scanner 2 indicating that a radio wave is being radiated to the newly provided reflector. While a radio wave is radiated to the reflector, the peak value memory 41 stores peak information in synchronism with the oscillation of the oscillator 3. The peak value and the attenuation quantity of the attenuator 31 are proportionately adjusted in accordance with an excessed amount over a predetermined level. As a result, an output of the attenuator 31 is adjusted so as to maintain the reflection intensity of the newly provided reflector constant. In other words, even if the vapor amount in the air changes, it is possible to maintain the reflection intensity constant to thus prevent the detection sensitivity from being lowered.

According to the present invention, an unknown object such as a dangerous weapon possessed by a member to be checked can be visualized without contacting the member. Since a radio wave at a frequency easy to be absorbed by the member is used, the reflected radio wave from the member can be suppressed to discriminate and detect an unknown object such as a dangerous weapon, thus performing a check of one's belongings at airports or the like quickly and correctly.

We claim:

1. A method of detecting an unknown object comprising the steps of:
scanning and radiating a radio wave beam to a living body member to be checked, said radio wave beam having a frequency at which absorption of said radio wave beam by water exhibits substantially a peak so that the intensity of said radio wave beam reflected from said living body member becomes lower than a predetermined value;
obtaining the intensity of said reflected radio wave at each scan position of said radio wave beam; and detecting an unknown object possessed by said living body member to be checked in accordance with said reflected radio wave intensity.

2. A method of detecting an unknown object according to claim 1, wherein a vapor amount in the air is detected, and the intensity of said radiated radio wave is controlled in accordance with the detected value of said vapor amount.

3. A method of detecting an unknown object according to claim 1, wherein the intensity of said radiated radio wave is controlled such that the intensity of a reflected radio wave from a standard reflector set near at said member to be checked becomes a predetermined value.

4. A method of detecting an unknown object according to claim 1, wherein the frequency of said radio wave beam is one of substantially 180 GHz and substantially 310 GHz.

5. A method according to claims 2, 3 or 4, wherein the unknown object detecting step includes visually displaying the distribution of the reflected radio wave intensity at each scan position of the radio wave beam.

6. A method according to claim 5, wherein the step of visually displaying includes visually displaying the distribution of the reflected wave by superposing the distribution upon an image of the living body member to be checked taken by a television camera.

7. A method according to claims 2, 3 or 4, further comprising the steps of:
using another radio wave beam at a frequency having a larger reflection intensity of the living body member to be checked than that of the frequency of the first mentioned radio wave beam;
scanning the living body member to be checked by alternately switching between both radio wave beams;
obtaining a cross sectional image of the living body member, based on a time from each radio wave transmission to reflected wave detection and based on a signal representative of said scan position; and
displaying on the cross sectional image on intensity distribution of the reflected radio wave at each frequency, using a color brightness specific to each frequency.

8. A method according to claim 7, wherein in addition to the display of the cross sectional image, a scan line of the radio wave beam is displayed by superposing it upon an image of the living body member to be checked taken by a television camera.

9. A method according to claim 1, wherein the step of scanning and radiating a radio wave beam includes radiating a focused radio wave beam to the living body member to be checked and scanning the living body member to be checked with the focused radio wave beam.

10. A method of detecting an unknown object according to claim 9, wherein said unknown object detecting step visually displays the distribution of said reflected radio wave intensity at each scan position of said radio wave beam.

11. A method of detecting an unknown object according to claim 10, wherein said visualization displays the distribution of said reflected radio wave by superposing it upon an image of said member to be checked taken by a television camera.

12. A method of detecting an unknown object according to claim 9, comprising the steps of:
using another radio wave beam at a frequency having a larger reflection intensity of said member to be checked than that of the frequency of said first mentioned radio wave beam;
scanning said member to be checked by alternately switching said both radio wave beams;
obtaining a cross sectional image of said member, based on a time from each radio wave transmission to reflected wave detection and based on a signal representative of said scan position; and
displaying on said cross sectional image an intensity distribution of the reflected radio wave at each frequency, using a color brightness specific to each frequency.

13. A method of detecting an unknown object according to claim 12 wherein in addition to the display of said cross sectional image, a scan line of said radio wave beam is displayed by superposing it upon an image of said member to be checked taken by a television camera.

14. A method of detecting an unknown object according to claim 9, wherein the frequency of the radio wave beam is one of substantially 22 GHz, substantially 180 GHz and substantially 310 GHz.

15. A method according to claim 1, further comprising the step of subsequent to detecting an unknown object, scanning and radiating another radio wave beam having a frequency higher than the radio wave beam utilized for detecting the unknown object.

16. A method according to claim 15, wherein the another radio wave beam with the higher frequency is another frequency at which absorption of said another radio wave beam by water exhibits substantially a peak.

17. An apparatus for visualizing an unknown object comprising:
means for radiating a radio wave beam at a frequency at which absorption of said radio wave beam by water exhibits substantially a peak so as to have a small reflection intensity relative to a living body, to a living body member to be checked;
means for scanning said radio wave beam to said member to be checked;
means for receiving a reflected radio wave of said radiated radio wave beam;
means for obtaining the intensity of said received reflected radio wave at each scan position of said radio wave beam; and
means for displaying the intensity of said reflected radio wave as the distribution of said radio wave beam at each scan position.

18. An apparatus for visualizing an unknown object according to claim 7, further comprising means for controlling the frequency of a radio wave beam to make the reflection intensity of said living body smaller than a predetermined value.

19. An apparatus according to claim 17, wherein the frequency of said radio wave beam is one of substantially 180 GHz and substantially 310 GHz.

20. An apparatus according to claims 18 or 19, wherein the display means includes a camera for taking an image of the living body member to be checked, and displays a superimposed image of the reflection intensity distribution of the reflected radio wave upon said image taken by said camera.

21. An apparatus according to claim 17, wherein the means for radiating a radio wave beam radiates a focused radio wave beam.

22. An apparatus for visualizing an unknown object according to claim 21, wherein said display means includes a camera for taking an image of said member to be checked, and displays a superimposed image of the reflection intensity distribution of said reflected radio wave upon said image taken by said camera.

23. An apparatus according to claim 21, wherein the frequency of the radio wave beam is one of substantially 22 GHz, substantially 180 GHz and substantially 310 GHz.

24. An apparatus for visualizing an unknown object comprising:
   means for radiating a radio wave beam to a living body member to be checked, said radio wave beam including a first beam having a frequency at which absorption of said radio wave beam by water exhibits substantially a peak;
   means for scanning said radio wave beam to said member to be checked;
   means for alternately switching the frequency of said radio wave beam radiated from said radiating means, between said first beam with a frequency having a low reflection intensity of said living body member and a second beam with a frequency having a large reflection intensity of said living body member;
   means for detecting a reflected radio wave of said radio wave beam;
   means for obtaining the intensity of said detected reflected radio wave at each scan position of said radio wave beam;
   means for obtaining a cross sectional image of said member to be checked in accordance with a time from transmission of said radio wave beam to detection of said reflected radio wave, at each scan position of said radio wave beam; and
   means for displaying on said cross sectional image the intensity of said reflected radio wave in a color or brightness specific to each frequency of said radio wave beam.

25. An apparatus according to claim 24, wherein the frequency of said first beam is one of substantially 180 GHz and substantially 310 GHz.

26. An apparatus according to claim 25, further comprising a camera for taking an image of the living body member to be checked, whereby a superimposed image of the image taken by the camera upon a scan line of the radio wave beam is displayed.

27. An apparatus according to claim 2, wherein the means for radiating a radio wave beam radiates a focused radio wave beam.

28. An apparatus for visualizing an unknown object according to claim 27, further comprising a camera for taking an image of said member to be checked, whereby a superimposed image of said image taken by said camera upon a scan line of said radio wave beam is displayed.

29. An apparatus according to claim 27, wherein the frequency of the first beam is one of substantially 22 GHz, substantially 180 GHz and substantially 310 GHz.

30. An apparatus for visualizing an unknown object possessed by a living body member by radiating a radio wave beam, comprising:
   means for scanning a member to be checked by using a focused radio wave beam having a frequency at which absorption of said radio wave beam by water exhibits substantial a peak so that the reflection intensity of a living body is smaller than a predetermined value;
   means for obtaining the intensity of a reflected radio wave at each span position; and
   means for visually displaying the intensity distribution of said reflected radio wave at each scan position.

31. An apparatus for visually an unknown object according to claim 30, further comprising means for radiating another radio wave beam whose frequency has a larger reflection intensity of said member to be checked than that of the frequency of said first mentioned radio wave beam, said member to be checked is scanned by said scanning means by alternatively switching said both radio wave beams, means for obtaining a cross sectional image of said member based on a time from each radio wave beam transmission to reflected radio wave detection and based on a signal representative of said scan position, and means for displaying an intensity distribution of said reflected radio wave at each frequency on said cross sectional image, using a color or brightness specific to each frequency.

32. An apparatus for visualizing an unknown object according to claim 31, further comprising means for detecting a vapor amount in the air, and means for controlling the intensity of said radiated radio wave beam in accordance with the amount detected by said detecting means.

33. An apparatus for visualizing an unknown object according to claim 31, further comprising means for controlling the intensity of said radiated radio wave beam such that the intensity of a reflected radio wave from a standard reflector set near said member to be checked becomes a predetermined value.

34. An apparatus for visualizing an unknown object according to claim 30, further comprising means for detecting a vapor amount in the air, and means for controlling the intensity of said radiated radio wave beam in accordance with the amount detected by said detecting means.

35. An apparatus for visualizing an unknown object according to claim 30, further comprising means for controlling the intensity of said radiated radio wave beam such that the intensity of a reflected radio wave from a standard reflector set near said member to be checked becomes a predetermined value.

36. An apparatus according to claim 30, wherein the frequency of the radio wave beam is one of substantially 22 GHz, substantially 180 GHz and substantially 310 GHz.

37. An apparatus according to claim 30, wherein the frequency of said radio wave beam is one of substantially 180 GHz and substantially 310 GHz.

38. An apparatus according to claim 31, 32, 35, 19 or 27, further comprising means for radiating another radio wave beam whose frequency has a larger reflection intensity of the living body member to be checked than that of the frequency of said first mentioned radio wave beam, the scanning means scanning the living body member to be checked by alternately switching between both radio wave beams, means for obtaining a cross sectional image of the living body member based on a time from each radio wave beam transmission to reflected radio wave detection and based on a signal representative of the scan position, and means for displaying an intensity distribution of the reflected radio wave at each frequency on the cross sectional image, using a color or brightness specific to each frequency.

39. An apparatus for visualizing an unknown object comprising:

means for radiating first and second radio wave beams to a living body member to be checked;

means for scanning said first and second radio wave beams to said living body member to be checked;

means for alternately switching between said first and second radio wave beams, said first radio wave beam having a frequency providing a low reflection intensity of said living body member and said second radio wave beam having another frequency providing one of a large reflection intensity of said living body member and a low reflection intensity of said living body member;

means for detecting a reflected radio wave of each of said first and second radio wave beams;

means for obtaining the intensity of said detected reflected radio wave at each scan position of said first and second radio wave beams; and means for displaying an indication of the intensity obtained of said received reflected radio wave.

40. An apparatus according to claim 39, wherein said another frequency is higher than the frequency of said first radio wave beam.

41. An apparatus according to claim 39, wherein the scanning means scans the first and second radio wave beams on the same scan line.

42. An apparatus according to claim 39, wherein the frequency of at least the first radio wave beam is a frequency at which absorption of said first radio wave beam by water exhibits substantially a peak.

* * * * *